United States Patent [19]

Rajamannan

[11] Patent Number: 5,989,597
[45] Date of Patent: Nov. 23, 1999

[54] PROCESS FOR STERILIZING SOIL

[76] Inventor: Ambrose H. J. Rajamannan, 2120 Argonne Dr. NE., Minneapolis, Minn. 55421

[21] Appl. No.: 08/579,859

[22] Filed: Dec. 26, 1995

[51] Int. Cl.⁶ .................................................. A61K 33/02
[52] U.S. Cl. ........................... 424/719; 514/476; 514/579
[58] Field of Search ..................................... 514/476, 579; 504/326; 424/719; 435/262, 262.5, 264; 405/128; 47/58; 210/610, 600, 601

[56] References Cited

U.S. PATENT DOCUMENTS

| | | | |
|---|---|---|---|
| 4,994,487 | 2/1991 | Haglund | 514/476 |
| 5,075,332 | 12/1991 | Haglund | 514/476 |
| 5,302,287 | 4/1994 | Losack | 210/612 |
| 5,368,411 | 11/1994 | Losack | 405/128 |
| 5,464,457 | 11/1995 | Winston et al. | 47/58 |

*Primary Examiner*—Jean C. Witz
*Attorney, Agent, or Firm*—Herman H. Bains

[57] ABSTRACT

A process for continuously and instantaneously sterilizing soil comprising the steps of applying a water-activated chemical fumigant below the surface of the soil which simultaneously applying water to the soil below the surface. The soil, chemical fumigant and water are throughly mixed to cause instantaneous reaction of 100% of the chemical fumigant to produce a fumigant gas. Immediately covering the treated soil with a gas impervious material to retain the gas within the soil and kill the pathogens contained therein. Thereafter innoculating the soil with antgonistic organisms for preventing recontamination of the soil.

3 Claims, 1 Drawing Sheet

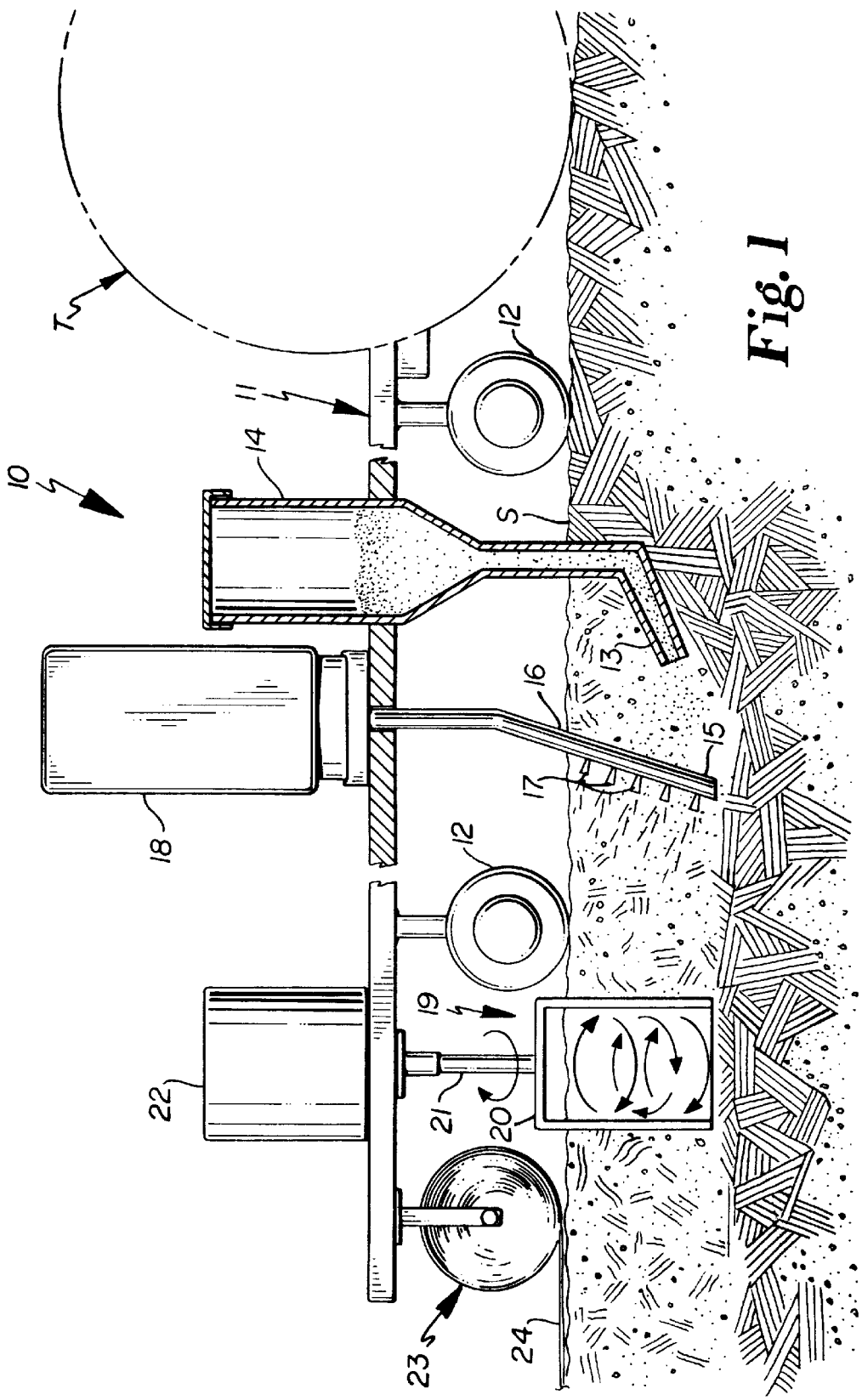

PROCESS FOR STERILIZING SOIL

FIELD OF THE INVENTION

This invention relates to a process for sterilizing soil and more specifically to a continuous process for applying a water activated fumigant, and a supply of water for activating the sterilizing fumigant.

BACKGROUND OF THE INVENTION

Methyl Bromide, the fumigant that is commonly used today around the world for killing soil pathogens, is being phased out from production and use by the year 2000 as it has been proven to destroy the ozone layer. Other fumigants currently available, such as Metam Sodium (sodium methyldithiocarbamate, Dazomet (mylone), and anhydrous ammonia have been found not to be as good as methyl bromide. These fumigants are water activated fumigants and require the presence of water to produce the necessary reaction and the production of the sterilizing fumigant gas.

Normally, when a water activated fumigant is injected into the ground and a plastic mulch is spread on this ground to hold the gases to kill the pathogens, this plastic prevents rain or irrigation water from entering the soil. If water enters the soil, this moisture does not evenly react with the water activated chemical. This is the main reason why these water activated chemicals have never worked as well as they should.

These water activated fumigants also require a certain soil temperature to activate the fumigant. In routine use, the farmer or grower applies these water activated fumigants and waits for rain or irrigation to activate the chemicals. Soil temperatures being unpredictable, these water-temperature-dependant chemicals perform unevenly and poorly. Uneven activation within the soil profile leaves some inactivated chemicals to persist. These inactivated chemicals are eventually activated during the growing season, but this erratic activation causes undesirable consequences such as killing or stunting of the desirable plants grown in the treated soil.

SUMMARY OF THE INVENTION

An object of this invention is to provide a novel process to continuously and instantaneously sterilize the soil in open fields with a water activated fumigant. In carrying out the novel process, a water activated chemical fumigant is dispersed into the soil while simultaneously injecting water within the range of 5,000 gallons to 175,000 gallons per acre into the soil, and then thoroughly mixing the soil containing the water and water activated fumigant to thereby instantaneously activate 100% of the chemical to produce a fumigant gas. A gas impervious sheet of plastic or foam is immediately applied to the treated soil to hold the gas within the soil. The fumigant gas kills soil borne pathogens and effectively sterilizes the soil.

BRIEF DESCRIPTION OF THE SOIL OF THE FIGURE OF THE DRAWING

FIG. 1 is a diagrammatic view of the apparatus used in carrying out the novel method.

DESCRIPTION OF THE PREFERRED EMBODIMENT

Referring now to FIG. 1, it will be seen that a diagrammatic illustration of an apparatus, designated generally by the reference numeral 10, is there shown and is used to carry out the novel sterilizing process. The apparatus 10 includes an elongate frame 11 provided with a plurality of ground engaging wheels 12 to permit traversal of the apparatus over the surface S of the ground. The apparatus is towed by a tractor T over the field to be treated.

Apparatus 10 includes a chemical fumigant dispenser 13 which dispenses a chemical fumigant into the soil below the surface thereof. It is preferred that the dispenser be incorporated with a soil breaking tool. The chemical fumigant dispenser 13 is connected in communicating relation into a container 14 which contains a supply of the chemical fumigant. The chemical fumigant is dispensed into the soil as the apparatus 10 is moved in a predetermined direction as illustrated by the directional arrow.

It is pointed out that a plurality of the chemical fumigant dispensers 13 may be provided and will be arranged in side by side relation to permit treatment of a relatively wide transverse zone of the field. The apparatus 10 also includes a water injector device 15 or a plurality thereof each including tubes 16 projecting into the soil and having a plurality of water injector nozzles 17 extending therefrom. In the embodiment shown, the nozzle 17 may be vertically arranged and the tool 16 is connected in communicating relation to a tank 18 or other source of water mounted on the frame 11.

The apparatus 10 also includes a rotary harrow device 19 which includes vertical tines 20 connected to a shaft 21 which is connected to a drive device 22 mounted on the frame 11. When the drive device is 22 is energized, the rotary harrow device will rotate about a vertical axis and will thoroughly and vigorously mix the soil, chemical fumigant and the water into a slurry of mud consistency. This vigorous agitation instantly activates 100% of the fumigant chemical which releases the gas into the soil.

A roll 23 of mulch cover is suspended from the frame 11 just rearwardly of the harrow device and is unwound as the apparatus is moved in the direction of travel to immediately lay a covering sheet 24 of the mulch cover upon the surface of the soil which has been treated. The mulch cover is formed of a suitable black plastic in the embodiment shown although a layer of foam could also be dispensed upon the surface of the ground to prevent escape of fumigant from the soil. The mulch cover is gas impervious and serves to trap and hold the fumigant gas into the soil to produce an effective sterilization of the soil borne pathogens.

It has been found that this continuous process permits the use of a lower amount of the chemical fumigant to be used. Since there is an instantaneous 100% activation of the water active fumigant, approximately 25% of the usual amount of chemical may be used and there is no carry over of the chemical in the growing season. It is also pointed out that in order to prevent reinfection of the soil pathogens into the sterilized area, various antagonistic organisms can be injected into the soil profile within days of the fumigation. It has also been found that this process will give far better soil than the conventional fumigants including methyl bromide and will give longer term control of the soil pathogens.

It will therefore be seen that the present process causes forced instant activation of the chemical fumigant while utilizing a minimum amount of the chemical to achieve optimum performance.

It is will further be seen that present process substantially assures that there will be no inactivated chemical to persist in the soil and thereby cause phytotoxicity to plants grown in the soil later on. Finally, the present process will allow long term crops such as nursery plants to establish themselves with out being attacked by pathogens very soon after being planted as the antagonism of the inoculated organisms will hold down the pathogen population to below economically damaging limits.

Thus it will be seen that I have provided a novel process for sterilizing soil which is more efficient and more effective than any heretofore comparably treatment methods.

What is claimed is:

1. A process for continuously and instantaneously sterilizing the soil, comprising;

dispensing a water activated fumigant into the soil below the surface thereof from a dispensing medium as the latter is moved through the soil, in a predetermined path of travel, continuously injecting water into the soil containing the fumigant from a water injection medium within the range of 5,000 gallons to 175,000 gallons per acre as the water injecting medium is moved through the soil, the water injection medium located rearwardly of the fumigant dispensing medium with respect to the direction of travel, and mechanically mixing the soil containing the fumigant and water with a rotary mixing medium projecting into the soil to vigorously mix the soil, fumigant and water into a slurry to instantly activate 100% of the fumigant to thereby form a fumigant gas within the soil, the rotary mixing medium located rearwardly of the water injection medium with respect to the direction of travel.

2. A process for continuously and instantaneously sterilizing the soil, comprising;

dispensing a water activated fumigant into the soil below the surface thereof from a dispensing medium as the latter is moved through the soil, continuously injecting water into the soil containing the fumigant from a water injection medium within the range of 5,000 gallons to 175,000 gallons per acre as the water injecting medium is moved through the soil and mechanically mixing the soil containing the fumigant and water to form the soil, fumigant and water into a slurry of mud consistency and to instantly activate 100% of the fumigant form a fumigant gas within the soil.

3. The process as defined in claim 1 wherein said rotary medium is rotatable about a vertical axis.

\* \* \* \* \*